United States Patent [19]
Nissel

[11] 3,918,865
[45] Nov. 11, 1975

[54] COEXTRUSION SYSTEM
[75] Inventor: Frank R. Nissel, Ambler, Pa.
[73] Assignee: Welex Incorporated, King of Prussia, Pa.
[22] Filed: Sept. 28, 1973
[21] Appl. No.: 401,669

[52] U.S. Cl. ............................. 425/131.1; 264/171
[51] Int. Cl.² .......................................... B29D 3/12
[58] Field of Search ..... 264/171, DIG. 57; 425/131, 425/133

[56] References Cited
UNITED STATES PATENTS

| | | | |
|---|---|---|---|
| 3,327,349 | 6/1967 | Lennox | 425/133 |
| 3,334,382 | 8/1967 | Leferre | 425/133 |
| 3,405,425 | 10/1968 | Buckley et al. | 425/131 |
| 3,423,498 | 1/1969 | Lefevre | 425/131 X |
| 3,477,099 | 11/1969 | Lee et al. | 425/131 |
| 3,528,130 | 9/1970 | Lefevre et al. | 425/131 |
| 3,565,985 | 2/1971 | Schrenk et al. | 425/131 X |
| 3,606,636 | 9/1971 | Glass et al. | 425/131 |
| 3,724,984 | 4/1973 | Jernigan | 425/131.1 |
| 3,743,143 | 7/1973 | Barney et al. | 425/131 X |
| 3,825,383 | 7/1974 | Hoagland et al. | 425/131 |

FOREIGN PATENTS OR APPLICATIONS
1,543,384   9/1968   France ............................... 425/131

*Primary Examiner*—R. Spencer Annear

[57] ABSTRACT

Coextrusion system producing laminar multi-layer plastic sheets. Special plastic layers are laid at selected surface portions of a continuously extruded plastic core, and the shape of the product is converted to a sheet. The added layers are provided through separate passageways, and valves control the selection of passageways, allowing the production of plastic laminar sheets in a wide variety of combinations. The added layers are conveniently provided by one or more adaptor dies disposed upstream of the extruder which forms the sheet.

14 Claims, 5 Drawing Figures

COEXTRUDED SHEET PRODUCT

COEXTRUSION SYSTEM

INTRODUCTION

This invention relates to a coextrusion system, more particularly to an apparatus and method for forming a multi-layer sheet of plastic materials which are firmly and continuously bound to one another.

BACKGROUND OF THE INVENTION

Coextrusion has recently emerged as a very practical, economical way of producing plastic sheets having unique properties and new uses.

For example, polystyrene can be obtained in crystalline form which provides a beautiful, glossy surface when applied as a thin layer to a sheet of high-impact polystyrene which itself has a dull surface. The properties of the laminated components complement each other admirably, because the strength and flexibility of the high-impact polystyrene provide a vital support for the rather fragile and brittle crystalline polystyrene layer. The product, in several variations, has been found useful for making containers such as cups, bowls, dishes and the like.

Lamination of already extruded sheets is quite a costly operation, and it has been discovered that superior products can be manufactured at less expense by coextruding plastic materials while in a (heated) plastic condition.

Coextrusion has also been found highly effective for producing sheet products such as those requiring different colors on opposite sides, or those requiring a radiation-stable or a chemically resistant surface on one or both sides, for example.

In my copending U.S. application Ser. No. 118,410, filed Feb. 24, 1971, now abandoned, I disclose a coextrusion system in which a layer of supplemental material is applied in a heat plastified condition over only about one-half of the periphery of a heat-plastified rod or core, followed by extruding the product into a laminated sheet. In such a procedure it was discovered that the lamina in the rod or core can undergo drastic shape reformation in the extruder and that the lamina not only retain their identities but have repeatably predictable relative proportions in the final sheet product. The lamina, squeezed together under pressure while heat-plastified, adhere firmly and continuously to each other in the sheet product.

In my copending U.S. application Ser. No. 264,387, filed June 19, 1972, now U.S. Pat No. 3,833,704 granted Sept. 3, 1974 I disclose the lamination of the supplemental plastic material over less than half the periphery of the rod or core. In my copending U.S. application Ser. No. 287,509, filed Sept. 8, 1972, now abandoned in favor of a continuation application filed Dec. 19, 1974, under Ser. No. 534,428. I disclose the introduction of the supplemental heat-plastified material internally within the primary flowable material, using a probe or lateral feed tube which itself penetrates into the primary material in an adaptor located upstream of a sheet die which converts the resulting composite material into a laminated sheet. The presence of the probe does not cause any significant irregularity of thickness in the final sheet, because the plastic material flows toward the center again quite quickly downstream of the probe.

BRIEF SUMMARY OF THE INVENTION

Briefly, a laminated thermoplastic sheet is made according to this invention by continuously advancing a flowable plastic material along a predetermined path, supplying one or more layers of a supplementary plastic material in plastic laminar flow to the material, selectively valving the supplementary plastic so that it is applied only to selected spaces on or within the material, and extruding the composite product into the shape of a sheet. The coextrusion apparatus that is used involves one or more, or even a series of adaptors interposed between the extruder and the sheet die, each one of which adaptors may be connected to the same or to a different flowable laminating material, and each adaptor being equipped with pre-designed passageways so dimensioned and arranged as to apply the supplementary plastic material over only a limited portion (usually less than half) of the surface area of the material, or by injection within the material. Each such passageway is connected through a controllable valve or other flow controlling means to the plastic material source (such as a side extruder, for example), allowing rapid and convenient changes on the production line from one laminated product to another. Actually, with several adaptors and several valved passageways per adaptor, many permutations and combinations of layers are attainable.

In this specification and in the claims where reference is made to "upstream" or "downstream" locations in the coextrusion system, the reference basis is the direction of flow of the plastic material. Thus, where one component is located downstream of another, it is located closer in the sequence of operations to the final sheet extrusion step, and farther away from the primary step of forming the initial body of flowable material.

DRAWINGS

DETAILED DESCRIPTION OF THE INVENTION

Figure 1:
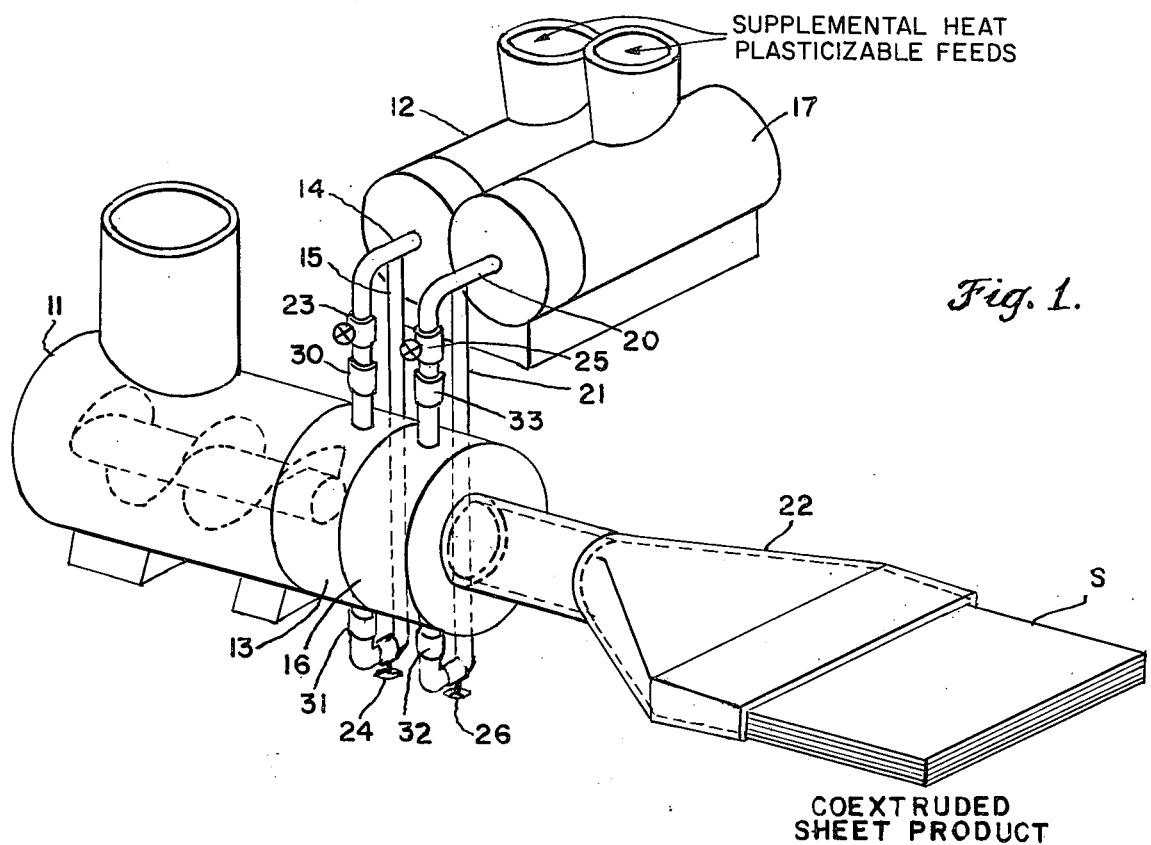
FIG. 1 is a perspective schematic view showing a typical combination of extruder, two adaptors arranged in series and a sheet die comprising one example of this invention.

Referring particularly to FIG. 1 of the drawings, extruder 11 is preferably but not necessarily of the rotating worm type and, if so, it may be either single screw or twin screw. Hot plastified polymer or other material is extruded out of extruder 11, usually circular or oval-shaped in cross section (but other cross-sections may be used) into the adaptor 13. A side extruder 12 serves as a source for another (supplemental) hot plastified material, which is conducted to various points around the periphery of the plastic material within the adaptor 13 by a plurality (here shown are two) of pipes 14, 15.

Another adaptor 16 is located immediately downstream of adaptor 13, and it is supplied with still another hot plastified material by another side extruder 17, by pipes 20, 21 leading to different locations spaced apart from one another around the periphery of the core.

The number 22 designates a sheet die having an internal bore which gradually changes from the original (rounded, for example) cross-section to the wide, flat, straight line configuration of a sheet. The sheet S, shown with five laminations, emerges from extruder die 22 as the laminated product.

As shown, the feed pipes 14, 15 and 20, 21 are provided respectively with flow control valves 23, 24 and 25, 26 which can be opened or closed in order to activate or close off the corresponding feed pipe. This allows the operator to select various combinations of layers for any given run.

Also, each feed pipe 14, 15, and 20, 21 is fitted with one-way check valves 30, 31 and 32, 33 which allow the material from the side extruders 12, 17 to flow only in the direction into the corresponding adaptors 13, 16 but not in the opposite direction back into the side extruders 12, 17.

As will now be apparent, it is advantageous to supply one side extruder with one material and the other with another, to create a special laminated sheet having special combinations of physical and chemical properties, and colors as well.

Figure 2:
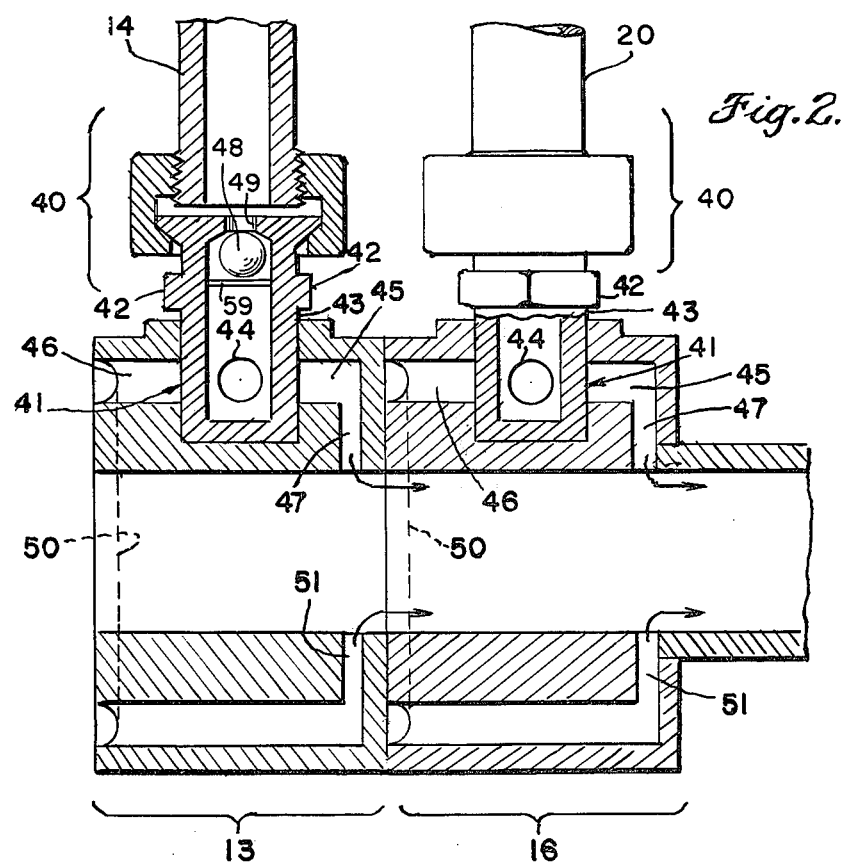
FIG. 2 is a sectional view through a modified form of adaptor which embodies features of this invention.

Referring now to FIG. 2 of the drawings, the modified form of the adaptor there shown includes a removable coupling 40 located in the side feed pipe 14, so constructed that the supplemental plastic material may be fed selectively to either one or two spaced areas around the core. The number 41 designates a three-way valve which may itself be of conventional form, having flats 42 engageable by a wrench to turn the body portion 43 of the valve. Valve 41, as is usual with valves of this type, has three passages 44, 45, 46 connecting the plastic material either (a) only to the upper space 47 or (b) to the annular ring-shaped passageway 50 which leads to the lower space 51, or (c) to both spaces 47 and 51. The ring-shaped passageway 50 is desirably a channel extending 360 degrees around the axis of flow of the core.

The three-way valve 41 also desirably includes a ball check valve having a ball 48, a seat 49 and a thin retainer rod 59 which prevents ball 48 from falling into the body of the adaptor.

Thus, letting "A" represent the flowable material from extruder 11 and "B" a supplemental plastic, the following combinations may be laminated with the use of only one adaptor 13:

$$\frac{B}{A}, \frac{A}{B}, \frac{B}{A}, \text{ and } A$$

And using two adaptors, where "C" is the additional plastic material introduced by way of adaptor 16, the following combinations may be laminated:

$$\frac{B}{A}, \frac{C}{B}, \frac{C}{B}, \frac{A}{B}, \frac{A}{B}, \text{ and many others.}$$

Figure 5:
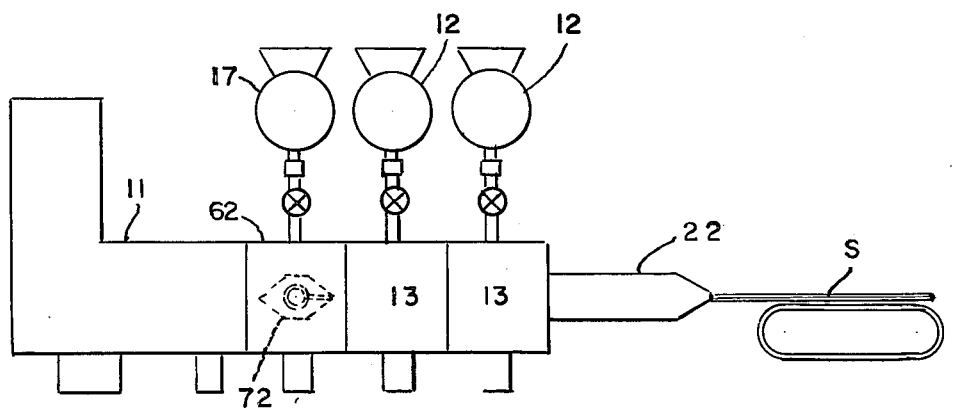
FIG. 5 is a schematic side view of an apparatus similar to FIG. 1, but showing three adaptors in series.

Using three such adaptors as shown in FIG. 5 of the drawings, (thus providing a fourth plastic material "D") it is possible to produce an extremely large number of variations, one of which is a classically useful material $$\frac{D}{B}$$
$$\frac{A}{}$$

where A typically represents a reground core prepared by regrinding and reheating the scrap which resulted from cutting forms and shapes from laminated sheet previously produced in the process, C represents a specially colored polymer layer, B represents another polymer layer having a different color, and D represents a very thin layer of glossy crystalline polystyrene. Such a material is useful for making colorful, durable drinking glasses and cups, for example.

Many other specific examples, tailored to the specific intended use, will readily occur to those skilled in the art.

Figure 3:
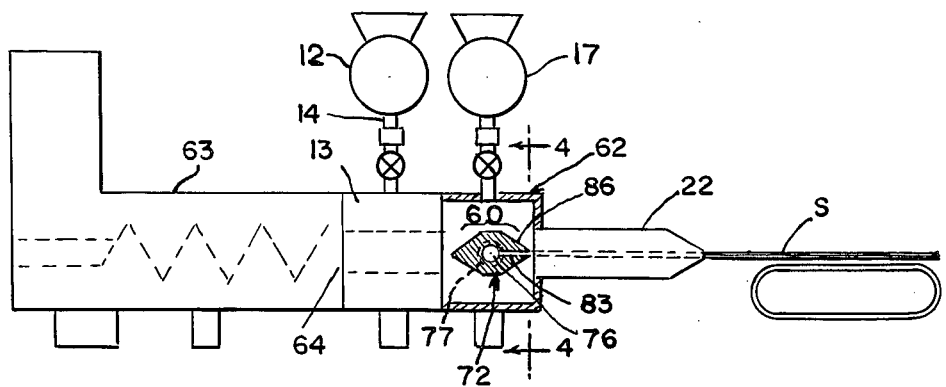
FIG. 3 is a schematic view of a modified form of this invention, showing two feed tube adaptors arranged in series, showing a stacking arrangement.
Figure 4:
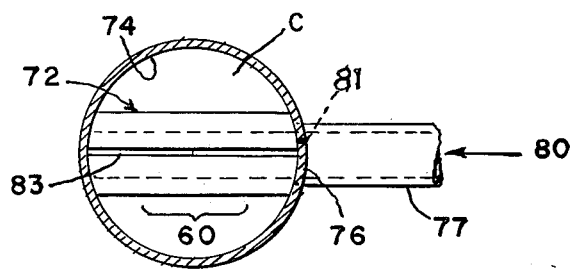
FIG. 4 is a sectional view of the downstream adaptor of FIG. 3, taken as indicated by the lines and arrows 4—4 which appear in FIG. 3.

Referring to FIGS. 3 and 4 of the drawings, the number 62 represents a modified type of adaptor shown in tandem with and downstream of a second adaptor 13 of the type shown in FIG. 1, which in turn receives a stream of plastic material introduced from a main extruder 63 which in turn abuts it at the upstream side 64. The adaptor 62 houses an internal feed device 60 like that shown in my aforementioned copending U.S. patent application Ser. No. 287,509, filed Sept. 8, 1972, having a probe 72 which has a sharp upstream edge and a downstreamwardly tapered discharge apex 86.

Referring to FIG. 4, a side feed tube 80 connected to the side extruder 17 passes into the interior 74 of the adaptor 62 through an opening 76, to which is connected a lateral feed tube 77 secured to the side wall of the adaptor. Lateral feed tube 77 has an inlet 80 in fluid communication with a cavity 81 opening into the interior of the flowable material through a discharge slot 83, which opens in a downstream direction and preferably extends completely across the flow path provided by the interior 74 of the adaptor.

Although FIG. 3 shows the adaptor 62 disposed downstream of the adaptor 13, it is to be understood that an adaptor 62 may be disposed upstream of an adaptor 13, as shown in FIG. 5, and that the two adaptors 62 of FIGS. 3 and 5 may be disposed in tandem, abutting each other. In the latter case, the supplemental plastic material, introduced from the discharge slot 83 of the upstream adaptor 62, flows around the sharp upstream edge of probe 60 of the downstream adaptor 62 providing layers of the supplemental plastic which divide and flow around the tapered apex 86 of the downstream probe 72 and surround the material coming therefrom, and also join with the plastic originally introduced by the main extruder.

Various modifications of probe 72 may be used, some of which are described in detail in my aforesaid copending application Ser. No. 287,509, filed Sept. 8, 1972, and by using these in a variety of stacked relationship, many variations of plastic material and layered configurations can be produced by internal introduction into the flowable material.

By providing a combination of adaptors as a variation of FIG. 3, one or more layers may be introduced internally into the core while one or more other layers may be introduced on selected portions of the core surface. Further, either adaptor may be arranged upstream or downstream of the other. This provides great advantages of flexibility and variety.

Processes according to this invention are effective in producing many new products, as well. In many cases, when adhesives were previously required to cement various layers together, the adhesion inherently produced by squeezing heat-plastified layers together under pressure, in situ as formed, is of a different and much higher order of magnitude and often eliminates the need for separate adhesives. Further, the uniformity attainable according to this invention far exceeds that previously possible.

It is quite simple, according to this invention, for an operator to change the production line from one type of product to another during a day's run. The removable couplings 40 of one or more adaptors can be opened up and connected to different side extruders, providing different material sources for the laminations. Any three-way valve 41 can be adjusted to provide any given layer at one or two locations, and multiple-way valves providing an even greater number of combinations and selections may be used instead.

The supplementary plastic materials are usually heat-plastified thermoplastic polymers, but other flowable substances having laminar flow characteristics such as adhesives, dyes, colors and the like may be used in some configurations and all are intended to be included within the meaning of the term "supplementary plastic material".

Although this invention has been described with reference to specific embodiments and modifications, it will be apparent from the disclosure that many variations may be made, including the substitution of equivalent elements for those specifically shown and described, reversal of parts or sequences of steps of the method, and the use of certain features independently of the use of other features, all within the spirit and scope of the invention as defined in the appended claims.

The following is claimed:

1. A coextrusion system for producing a multi-laminar plastic sheet, comprising: primary means continuously advancing a flowable plastic material, an adaptor arranged to conduct said material to flow in a predetermined path of advancement, supply means connected to said adaptor to supply continuously a flowing laminar body of supplementary flowable plastic material in said adaptor to said material, means forming a plurality of passages connected to said adaptor arranged respectively to supply said supplementary flowable plastic material to a limited portion of the area of said material at spaced locations around the transverse perimeter of said path, flow interrupting means connected to said adaptor movable selectively to divert said supplementary flowable plastic material to flow in one or more preselected passages, and a sheet die converting the shape of said flowing laminar material to substantially sheet form.

2. The coextrusion system defined in claim 1, wherein a plurality of such passageways are formed in said adaptor, and wherein said flow adjusting means includes valving means provided with adjusting means for applying said supplementary flowable plastic material at a plurality of spaced-apart locations to said flowable material.

3. A coextrusion system for producing a multi-laminar plastic sheet, comprising: primary means continuously advancing a flowable plastic material, an adaptor arranged to conduct said material to flow in a predetermined path of advancement, supply means connected to said adaptor to supply continuously a flowing laminar body of supplementary flowable plastic material in said adaptor to said material, means forming a plurality of passages connected to said adaptor and in said adaptor arranged to supply said supplementary flowable plastic material at spaced locations in relation to said path, flow adjusting means connected to said adaptor movable selectively to divert said supplementary flowable plastic material to flow in one or more preselected passages, said flow adjusting means including valving means provided with adjusting means for applying said supplementary flowable plastic material at a plurality of spaced-apart locations to said flowable material, said valving means including a multiple-way valve provided in said adaptor, said valve having means for connecting to a passageway in said adaptor leading to only one location adjacent said flowable material, and having alternate means for connecting to passageways in said adaptor leading to a pair of opposed locations adjacent opposed portions of said flowable material, and means for adjusting said valve from one of said connecting positions to the other, and a sheet die converting the shape of said flowing laminar material to substantially sheet form.

4. The coextrusion system defined in claim 1, wherein an adjustable coupling is provided for connecting the source of said supplementary flowable plastic material into said adaptor.

5. The coextrusion system defined in claim 4, wherein said adjustable coupling is provided with valving means for selectively diverting said supplementary flowable plastic material to flow in one or more preselected passages for applying said supplementary flowable plastic material to said flowable material and including means to provide for adjustment of said valving means.

6. The coextrusion system defined in claim 1, wherein a plurality of said adaptors are provided, arranged in series in the path of flow of said material.

7. The coextrusion system defined in claim 6, wherein each of said adaptors has a connection to a separate source of supplementary flowable plastic material.

8. The coextrusion system defined in claim 7, wherein at least one of said adaptors includes an adjustable multiple-way valve having a plurality of positions for diverting the flow of said supplementary material selectively to one or more preselected passages for applying said supplementary material to said flowable material, and means for adjusting said valve from one position to another.

9. The coextrusion system defined in claim 1, wherein a plurality of said adaptors are provided downstream of said primary means and upstream of said sheet die means.

10. The coextrusion system defined in claim 1, wherein said adaptor arranged to apply a lamination superficially to said material has arranged in tandem therewith an adaptor arranged to supply a lamination internally within the material.

11. The coextrusion system defined in claim 1, wherein a second adaptor for applying internally is arranged in series with said adaptor for applying superficially and said adaptor for applying internally.

12. The coextrusion system defined in claim 10, wherein the adaptor for applying internally is located immediately upstream of the adaptor for applying superficially.

13. The coextrusion system defined in claim 1, wherein at least three of said adaptors are arranged in series with one another.

14. The apparatus defined in claim 1, wherein a check valving means, operable and effective to check flow of said supplementary flowable plastic material rearwardly toward said supply, is provided in said supply means.

\* \* \* \* \*